(12) United States Patent
Mrowka et al.

(10) Patent No.: US 12,084,626 B2
(45) Date of Patent: Sep. 10, 2024

(54) SPRING PART FOR A DRIVING DEVICE AND METHOD OF MANUFACTURING A SPRING PART

(71) Applicant: Edscha Engineering GmbH, Remscheid (DE)

(72) Inventors: Peter Mrowka, Remscheid (DE); Christian Bartschies, Remscheid (DE); Gerhard Bauer, Remscheid (DE); Jochen Bals, Remscheid (DE)

(73) Assignee: EDSCHA ENGINEERING GMBH, Remscheid (DE)

( * ) Notice: Subject to any disclaimer, the term of this patent is extended or adjusted under 35 U.S.C. 154(b) by 0 days.

(21) Appl. No.: 17/953,747

(22) Filed: Sep. 27, 2022

(65) Prior Publication Data

US 2023/0108973 A1 Apr. 6, 2023

(30) Foreign Application Priority Data

Oct. 1, 2021 (DE) .......................... 102021125588.0

(51) Int. Cl.
*C10M 107/50* (2006.01)
*C09J 175/04* (2006.01)
(Continued)

(52) U.S. Cl.
CPC .......... *C10M 107/50* (2013.01); *C09J 175/04* (2013.01); *C10M 7/00* (2013.01);
(Continued)

(58) Field of Classification Search
CPC .......... F16F 1/04; F16F 1/024; F16F 2230/04; F16F 2228/08; F16F 2230/0052; F16F 2234/02; C10M 7/00; C10M 177/00; C10M 107/50; C10M 2229/006; C10M 2201/066; C10M 2213/062; C10M 2201/061; E05F 1/1041; E05F 15/622; C09J 175/04;
(Continued)

(56) References Cited

U.S. PATENT DOCUMENTS

| 2005/0209115 | A1* | 9/2005 | Kinoshita | ............ C10M 169/06 |
| | | | | 508/552 |
| 2012/0305040 | A1 | 12/2012 | Senatro | |

(Continued)

FOREIGN PATENT DOCUMENTS

| DE | 19549094 A1 | 4/1997 |
| DE | 19632183 A1 | 11/1997 |

(Continued)

*Primary Examiner* — Vishal V Vasisth
(74) *Attorney, Agent, or Firm* — Davidson Kappel LLC

(57) ABSTRACT

A spring part, in particular for a driving device, includes a spring body extending around a central axis. The spring body comprises several spring windings which run radially around a spring axis and are made of at least a base material. The base material is surrounded at least by a first protective layer, and the spring body is at least partially covered on the outside by a lubricant. A method for manufacturing a spring part includes the steps of providing a spring body with several spring windings made of a base material and coating the base material at least with a first protective layer. The method includes the step of applying a lubricant formed as a silicone-based lubricant to the outside of the coated spring body.

18 Claims, 3 Drawing Sheets

(51) Int. Cl.
*C10M 107/00* (2006.01)
*E05F 1/10* (2006.01)
*F16F 1/02* (2006.01)

(52) U.S. Cl.
CPC ............ *E05F 1/1041* (2013.01); *F16F 1/024* (2013.01); *E05Y 2900/531* (2013.01)

(58) Field of Classification Search
CPC ......... E05Y 2800/236; E05Y 2900/546; E05Y 2900/531; E05Y 2201/474; C10N 2050/08; C10N 2030/76; C10N 2030/12; C10N 2040/06; C10N 2050/023; C10N 2050/10
See application file for complete search history.

(56) References Cited

U.S. PATENT DOCUMENTS

| | | | |
|---|---|---|---|
| 2016/0178024 A1* | 6/2016 | Lee | B60G 11/14 267/286 |
| 2019/0024427 A1 | 1/2019 | Wittelsbuerger et al. | |
| 2022/0003033 A1 | 1/2022 | Bittner et al. | |

FOREIGN PATENT DOCUMENTS

| | | |
|---|---|---|
| DE | 102005007741 A1 | 8/2006 |
| DE | 102010015389 A1 | 10/2011 |
| DE | 202016105991 U1 | 1/2018 |
| DE | 209228913 U | 8/2019 |
| DE | 102016103800 A1 | 3/2020 |
| DE | 102018123186 A1 | 3/2020 |

\* cited by examiner

SPRING PART FOR A DRIVING DEVICE AND METHOD OF MANUFACTURING A SPRING PART

The present disclosure relates to a spring part and to a method for manufacturing a spring part, and to a driving device.

BACKGROUND

Known from practice are driving devices that are arranged between two components which are movable relative to one another, in particular between a pivotable vehicle door and a vehicle body, wherein the driving devices have a spring system for pretensioning, said spring system supporting, in a rest state of the driving device, the drive movement or the current position of the components to be moved. Known primarily in this respect are linear drives, such as spindle drives, which usually comprise a first and a second housing part, which can be telescopically displaced relative to one another and between which a spring system with at least a first spring part is arranged. Moreover, spring systems are also used in gas springs or in spring legs, which also provide passive support of a vehicle door. A problem with the driving device or also spring legs is often that the spring part installed therein causes undesirable impact noise during operation when the spring part is bent under the axial load radially in a direction perpendicular to a central axis of the spring part and, as a result, individual or multiple spring windings strike against an inner wall of the housing. It is indeed known that, by using a spring with a curved spring axis, support of the spring part within a hollow-cylindrical spring guide can be achieved, so that the spring windings are largely prevented from striking during operation. Due to the continuous contact of the spring-part windings with the spring guide, however, the problem may still exist that the spring part can, given the friction with the spring guide, cause noise, in particular due to a stick-slip movement of the spring windings relative to the guide surfaces of the spring guide.

DE 10 2018 123 186 A1 discloses a spring support with a telescopic housing with a first housing part and a second housing part, wherein the first housing part is pretensioned relative to the second housing part by means of a first spring part arranged between the first housing part and the second housing part. To reduce impact noise of the first spring part within the housing, a noise-reducing coating is provided on an inner side of the first housing part. The noise-reducing coating is formed as a flocking and/or as a lacquer layer. A disadvantage is that the noise-reducing coating for avoiding noise is applied in a relatively complex manner on the inner side of the first housing part or also of the second housing part. A further disadvantage is that the abrasive strength or also corrosion resistance of the spring part itself is not substantially improved. Moreover, in the event of contact of the spring windings with the guide surfaces of the first housing part or of the second housing part, disruptive noise can still occur in that the spring windings carry out noise-inducing stick-slip movement due to the non-optimal friction and sliding properties.

DE 10 2005 007 741 A1 discloses a piston-cylinder unit with a spring part designed as a helical compression spring, wherein the helical compression spring has an elastic outer layer at least on its surface facing radially inwards and facing the cylinder of the piston-cylinder unit. The elastic outer layer is formed as a flocking and has textile fibers and an adhesive layer, wherein the textile fibers are arranged in the adhesive layer. A disadvantage is that the reduction in noise, which is produced by the helical compression spring striking against a guide surface of the piston cylinder, is realized via complex flocking of the helical compression spring, wherein sufficient abrasive strength is not given in the long term, and an additional stick-slip movement is, furthermore, not sufficiently prevented, or prevented only with considerable effort.

US 2012/0305040 A1 discloses a spring part for a walking stick, wherein the spring part comprises a spring body extending around a central axis, wherein the spring body comprises several spring windings which run radially around a spring axis and are made at least of a base material formed as a musical wire. In this case, the base material is surrounded at least by a first protective layer, and the spring body is at least partially covered on the outside by a lubricant formed as a glossy, oil-based lacquer.

CN 2 09 228 913 U1 discloses a spring part comprising a spring body extending around a central axis, wherein the fault body comprises several spring windings which run radially around a spring axis and are made at least of a base material, wherein the base material is surrounded at least by a first protective layer, and the base material is at least partially covered on the outside by a lubricant formed as an oil.

DE 20 2016 105 991 U1 discloses a spring part for a spring support, wherein the spring part comprises a spring body extending around a central axis, wherein the spring body comprises several spring windings which run radially around a spring axis and are made at least of a base material. In this case, the base material is surrounded at least by a first protective layer formed as an adhesive layer, and the spring body or the first protective layer is at least partially covered on the outside by a lubricant.

DE 10 2016 103 800 A1 discloses a spring part for a driving device for driving a vehicle door, wherein the spring part comprises a spring body extending around a central axis, and the spring body comprises several spring windings which run radially around a spring axis and are made at least of a base material. In this case, the base material is surrounded by a first protective layer formed as a flocking.

DE 195 49 094 A1 discloses an alloy steel composition for the production of spring parts, wherein the steel composition comprises iron as the main constituent and is formed as a high-strength, alloyed city composition.

DE 10 2010 015 389 A1 discloses a spring body for a spring part, wherein the spring body comprises several spring windings which run radially around a spring axis and are made of at least a base material, wherein the base material is formed as alloyed steel and surrounded at least by a first protective layer which is formed as a zinc flake coating or as a hard zinc layer, or is produced by cathodic dip coating.

DE 196 32 183 A1 discloses a spring part for a spring support, wherein the spring part comprises a spring body which extends around a central axis and has several spring windings which run radially around a spring axis and are made at least of a base material. In this case, the base material is surrounded for corrosion protection by an elastomer molded part made of rubber.

SUMMARY

It is an object of the present disclosure to specify a spring part for a driving device, which is durable and cost-effectively enables operation with the lowest noise possible in a driving device. Furthermore, an aim of the present disclosure is to specify a method for manufacturing a spring part. Finally, it is an aim of the present disclosure to specify a low-noise and, moreover, cost-effective driving device with a spring part.

A spring part, in particular for a driving device, is provided, said spring part comprising a spring body extending around a central axis, wherein the spring body comprises several spring windings which run radially around a spring axis and are made of at least a base material, wherein the base material is surrounded at least by a first protective layer. The spring body is at least partially covered on the outside by a lubricant. The lubricant is formed as a silicone-based lubricant.

The first protective layer advantageously prevents pitting of the base material from occurring due to corrosion, which pitting would result in wire breakage. On the other hand, the lubricant advantageously prevents the occurrence of disturbing noise by the spring windings sliding on spring guide elements or spring guide components in a driving device. The lubricant in this case adjusts the span between static friction and dynamic friction, taking into account the materials contacting one another, such that a stick-slip effect is avoided. Further advantageously, the lubricant has a lower density than other lubricants, wherein the required quantity of lubricant is, moreover, significantly reduced, and preferably halved.

Particularly preferably, the lubricant is formed as a silicone grease. Advantageously, the silicone grease has noise-damping properties due to its high base oil viscosity and, moreover, lower breakaway torques at low temperatures and a reliable function even at high temperatures, due to a wide service temperature range. The silicone-based lubricant expediently comprises a solid additive. Particularly preferably, the solid additive is formed as PTFE. The addition of PTFE advantageously achieves low friction values and good emergency-operation properties in the boundary friction range. Accordingly, the spring part can, advantageously, be used reliably for a long time.

The base material is preferably formed as a metal or metal alloy. Particularly preferably, the base material is formed as an alloyed, high-strength steel wire. In an advantageous embodiment, the base material is formed as a chromium-silicon-vanadium-alloyed spring steel wire. Advantageously, the base material, and thus the spring body comprising the base material, is well suited for static and slightly dynamic stresses.

Particularly preferably, the first protective layer is applied to the base material in one of the following methods: dip-spinning method, spraying method, spray-coating method, and dip-drawing method. In a particularly preferred embodiment, the first protective layer is formed as a zinc flake coating. The zinc flake coating is preferably applied to the base material in the spraying method or spray-coating method. In an alternative embodiment, it is provided that the first protective layer be formed as a flexible lacquer layer. The flexible lacquer layer is preferably applied to the base material in the spraying method or spray-coating method.

In a further alternative embodiment, the first protective layer is formed as a solvent-based, adhesive layer. The adhesive used for the adhesive layer is preferably formed as a two-component adhesive with a base component and a hardener. The adhesive is particularly preferably formed as a solvent-based, polyurethane adhesive. In an expedient development, flock fibers are embedded in the adhesive layer, wherein the flock fibers protrude radially from an outer side of the adhesive layer. Preferably, the flock fibers are arranged on the adhesive layer and oriented in the direction of the longitudinal extension of the spring windings or in the direction of the longitudinal axis of the spring body. The flock fibers are preferably applied to the adhesive layer by electrostatic flocking. Advantageously, the flock fibers can improve the sliding properties and the abrasion resistance of the spring body, wherein, due to the lubricant layer applied to the outside of the flock fibers, the service life of the flock fibers themselves is, moreover, advantageously extended, since the latter are less damaged or worn down by continuous friction on the guide surfaces. Advantageously, the base material or the spring body is protected in continuous operation in such a way that corrosion, which can lead to wire breakage, does not occur.

In an advantageous development, the base material is surrounded by a second protective layer. The second protective layer is preferably arranged above the first protective layer. Particularly preferably, the second protective layer is applied to the first protective layer in one of the following methods: dip-spinning method, spraying method, spray-sintering method, spray-coating method, and dip-drawing method. In a particularly preferred embodiment, the second protective layer is formed as a sliding-lacquer layer. The sliding-lacquer layer advantageously contains a solid lubricant selected from a group comprising polytetrafluoroethylene (PTFE), molybdenum disulfide ($MoS_2$), boron nitride, graphite, or a combination of various solid lubricants. In an alternative embodiment, the second protective layer is formed as an organic, solvent-based, high-temperature coating. Particularly preferably, the second protective layer is formed as a PTFE coating. The PTFE coating is advantageously applied in a spray-sintering method, wherein PTFE is first sprayed on and subsequently sintered. Alternatively, the PTFE coating is produced in an electrostatic powder-coating method, wherein, advantageously, no solvent is required for this purpose.

In a further alternative embodiment, the second protective layer is formed as a solvent-based, adhesive layer. The adhesive used for the adhesive layer is preferably formed as a two-component adhesive. The adhesive is particularly preferably formed as a solvent-based, polyurethane adhesive. In an expedient development, flock fibers are embedded in the adhesive layer, wherein the flock fibers protrude radially from an outer side of the adhesive layer. Preferably, the flock fibers are arranged on the adhesive layer and oriented in the direction of the longitudinal extension of the spring windings or in the direction of the longitudinal axis of the spring body. The flock fibers are preferably applied to the adhesive layer by electrostatic flocking.

In a particularly preferred embodiment, it is provided that the first protective layer be formed as a zinc flake coating and the second protective layer arranged on the first protective layer be formed as a sliding-lacquer layer. In an embodiment alternatively provided, the first protective layer is formed as a flexible lacquer layer, and the second protective layer arranged on the first protective layer is formed as a sliding-lacquer layer. In a further preferred embodiment, it is provided that the first protective layer be formed as a zinc flake coating and the second protective layer arranged on the first protective layer be formed as a solvent-based, adhesive layer with a solvent-based, polyurethane adhesive.

A method for manufacturing a spring part is also provided, in particular a spring part as described above, comprising the following method steps: In a first method step, a spring body is provided with several spring windings made of a base material. In a second method step, a first protective layer is applied to the base material. In a third method step, a lubricant formed as a silicone-based lubricant is at least partially applied to the outside of the coated spring body. The production method according to the present disclosure advantageously creates a spring part which, due to the first protective layer, is corrosion-resistant and, moreover, due to the lubricant present on the outside of the spring body, has improved sliding properties with respect to guide surfaces within a driving device in which the spring part is installed, so that undesired noise generation is prevented.

In an expedient development, in the second method step, a second protective layer is applied to the previously applied, first protective layer. Advantageously, the thus produced multi-layer protective layer achieves, on the one hand, improved adhesion of the first protective layer to the base material on the one side, and, on the other hand, the second protective layer moreover achieves improved application of the lubricant on the other side and/or improvement of the corrosion protection.

In the second method step, the first protective layer is preferably applied to the base material in a spray-coating method. The spray-coating method can, advantageously, be designed as an electrostatic spray-coating method, wherein the coating material to be applied to the base material is applied as charged droplets to the grounded base material, and, thus, the first protective layer is produced. The application, advantageously, takes place in a very material-saving manner. Particularly preferably, cathodic dipping lacquer is used for this purpose. Alternatively, the first protective layer is applied to the base material in a dip-spinning method.

Further preferably, the second protective layer is applied to the first protective layer in a spray-coating method in the second method step. Alternatively, the second protective layer is applied to the base material in a dip-spinning method.

A driving device, in particular for driving a vehicle door, is also provided, said driving device comprising a housing comprising a first housing part and a second housing part, wherein the first housing part can be displaced relative to the second housing part along a longitudinal axis of the housing. Furthermore, the driving device comprises a spring system having at least a first spring part, comprising a first spring portion with several spring windings, wherein the spring windings each run radially around a spring axis. The first spring part pretensions the first housing part and the second housing part against one another in parallel to the longitudinal axis of the housing. The spring part is designed as described above. Advantageously, the first spring part can be secured against buckling by means of guide surfaces within the housing, and disruptive noise caused by the spring windings sliding on the guide surfaces is, moreover, advantageously avoided.

Further advantages, developments, and properties of the present disclosure emerge from the following description of preferred exemplary embodiments.

BRIEF SUMMARY OF THE DRAWINGS

The present disclosure is now explained in more detail with reference to the accompanying drawings using preferred exemplary embodiments.

DETAILED DESCRIPTION

Figure 1:
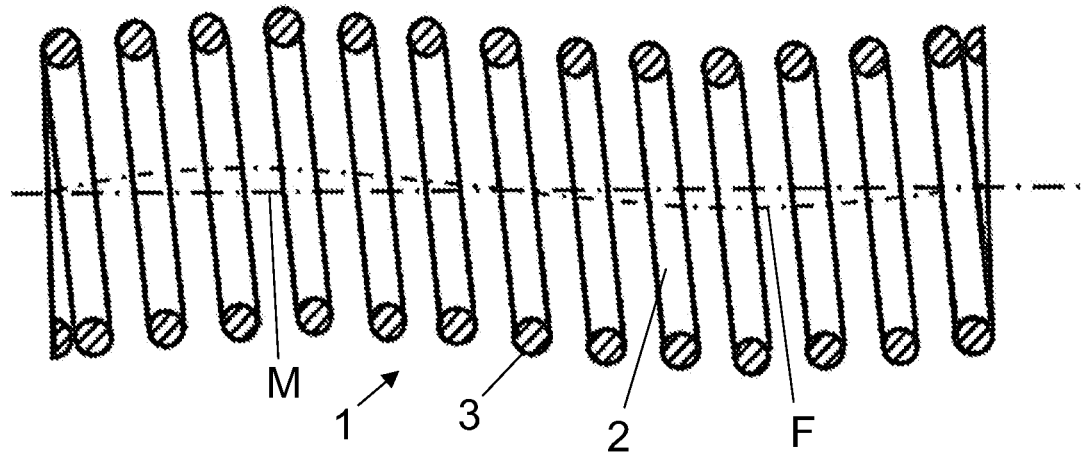
FIG. 1 shows a preferred exemplary embodiment of a spring part in the unloaded state in a side view.

FIG. 1 shows a preferred exemplary embodiment of a spring part 1 according to the present disclosure in the disassembled or unloaded state in a side view. In this illustration, the spring part 1 is not shown completely in the entire length for reasons of clarity.

The spring part 1 has a spring body 2 which extends lengthwise around a central axis M of the first spring part 1. The spring body 2 has several spring windings 3 which each run concentrically around a spring axis F. The spring axis F is designed to be curved and runs helically around the central axis M. As a result, the spring windings 3 are arranged at an offset from the central axis M so that the spring windings 3 each have a maximum radial distance and a minimum radial distance to the central axis M. Advantageously, the spring part 1 or the spring body 2 can be supported along a helical line at least in sections against guide components of a driving device, and thus counteract buckling and the associated striking against the guide components, as explained in more detail below.

Figure 2:
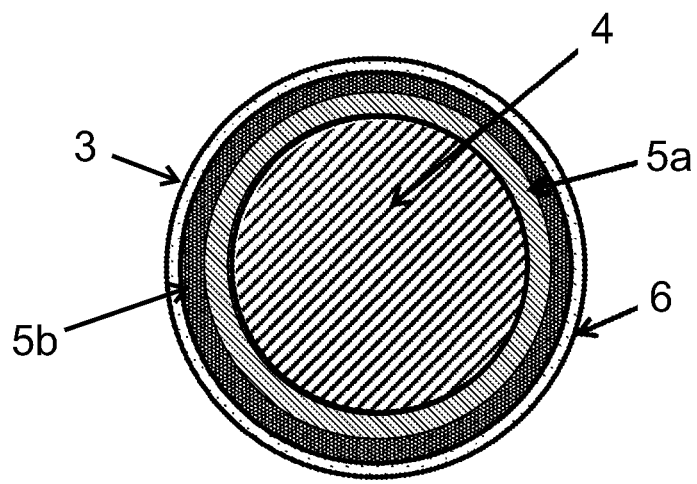
FIG. 2 shows a cross-section through a spring winding of the spring part of FIG. 1.

FIG. 2 shows a cross-section through a spring winding 3 of the spring part 1 of FIG. 1. In this view, it can be seen that the spring windings 3 or the spring body 2 shown in FIG. 1 consist of a base material 4 which forms the core of the spring windings 3. The base material 4 is formed as a chromium-silicon-vanadium-alloyed spring steel wire. The base material 4 is surrounded radially by a first protective layer 5a as a base coat and a second protective layer 5b applied to the first protective layer as a top coat, which in particular are to prevent the corrosion of the base material 4. The first protective layer 5a is formed as a zinc flake coating, which has been applied to the base material 4 by a spray-coating method. The second protective layer 5b is formed as a sliding-lacquer layer, which has been likewise applied in the spray-coating method. The second protective layer 5b in turn is surrounded by a layer of lubricant 6, which ensures improved sliding properties of the spring windings 3 with respect to guide components in a driving device. The lubricant 6 is formed as a silicone grease with PTFE as a solid additive and is thus, advantageously, particularly cost-effective and at the same time designed to be permanently effective against noise generation.

Figure 3:
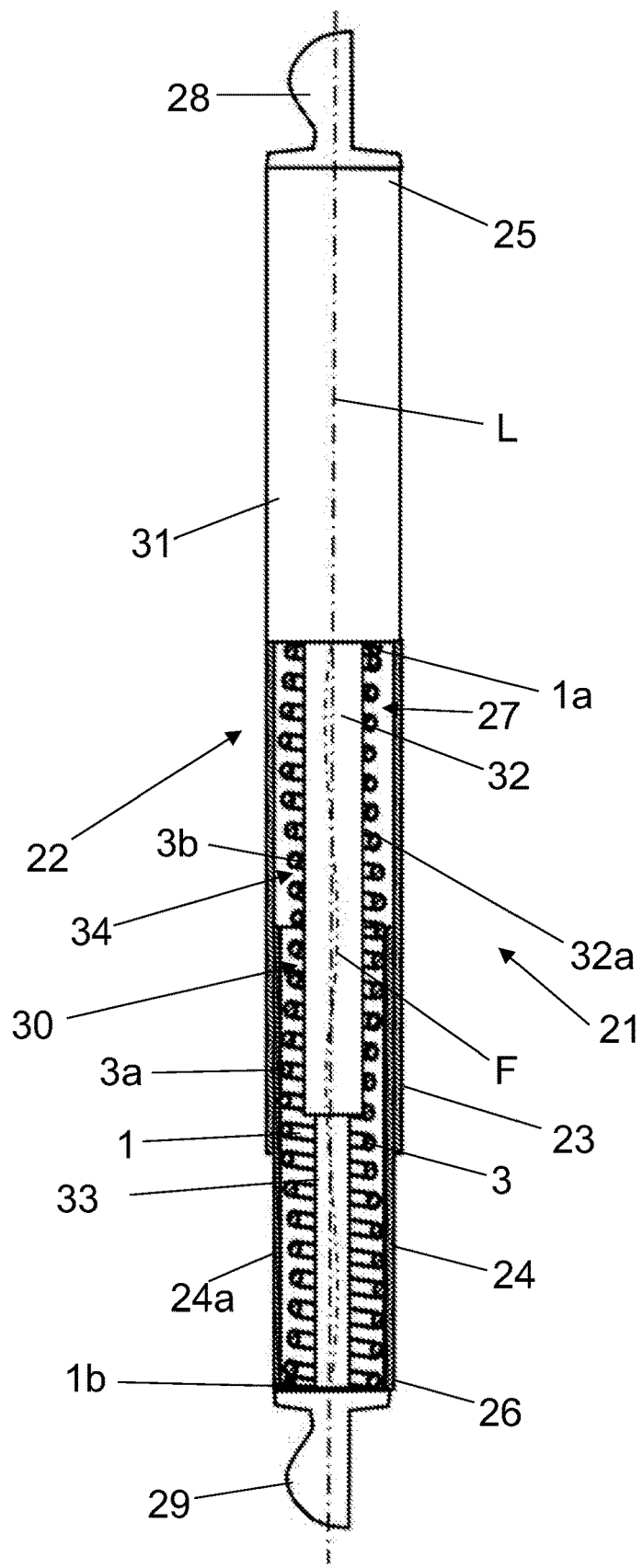
FIG. 3 shows a preferred exemplary embodiment of a driving device according to the present disclosure in a partially sectional side view.

FIG. 3 shows a preferred exemplary embodiment of a driving device 21 according to the present disclosure in a partially sectional side view. The driving device 21 comprises a housing 22 which extends along a longitudinal axis L and consists of a first housing part 23 and a second housing part 24. Both the first housing part 23 and the second housing part 24 are designed as semi-open, hollow cylinders, wherein the closed end of the first housing part 23 forms a first housing end 25, and the closed end of the second housing part 24 forms a second housing end 26.

The first housing part 23 has a larger outer or inner diameter than the second housing part 24, wherein the second housing part 24 is inserted into the first housing part 23 so that the first housing part 23 and the second housing part 24 can be displaced relative to one another in parallel to the longitudinal axis L of the housing 22. Since an inner diameter of the first housing part 23 corresponds approximately to the outer diameter of the second housing part 24, the first housing part 23 forms a guide for the second housing part 24, so that no or only a slight displacement of the first housing part 23 and of the second housing part 24 in the radial direction relative to the longitudinal axis L occurs during an axial displacement of the housing parts 23, 24 relative to one another.

As a result of the above-described arrangement of the two housing parts 23, 24, the overall closed housing 22 is thus formed, wherein the housing 22 encloses an installation space 27 which is arranged between the first housing end 25 and the second housing end 26. The volume of the installation space 27 is accordingly variable, since the first housing end 25 and the second housing end 26 can be displaced relative to one another in parallel to the longitudinal axis L.

A first fastening device 28 is arranged on the first housing end 25, and a second fastening device 29 is arranged on the second housing end 26, wherein the first fastening device 28 and the second fastening device 29 are each designed as ball sockets. Advantageously, the driving device 21 can thus be connected in an articulated manner to a vehicle body or a vehicle door so that the vehicle door, driven by the driving device 21, can be moved automatically between an open and a closed position by displacing the first housing part 23 relative to the second housing part 24 in parallel to the longitudinal axis L.

In the installation space 27 or in the housing 22, a spindle drive 30, which comprises a motor 31, a first guide tube 32, and a second guide tube 33, is arranged between the first housing end 25 and the second housing end 26. The first guide tube 32 and the second guide tube 33 are each designed as hollow cylinders, wherein the first guide tube 32 has a larger outer diameter than the second guide tube 33.

The second guide tube 33 can thus be displaced telescopically relative to the first guide tube 32 in parallel to the longitudinal axis L of the housing 22, wherein the length of the protruding part of the second guide tube 33 is smaller in a retracted state of the driving device 21, in which a distance between the first housing end 25 and the second housing end 26 is minimum, than in an extended state of the driving device 21, in which the distance between the first housing end 25 and the second housing end 26 is maximum.

The first hollow-cylindrical guide tube 32 surrounds a spindle rod (not visible here) which is coupled to the motor 31 and has an external thread. A spindle nut (likewise not visible here) is arranged in the second guide tube 33 in a stationary and rotationally-fixed manner, wherein the spindle nut has an internal thread which meshes with the external thread of the spindle rod. The spindle rod is rotated by the motor 31 so that the second guide tube 33 connected to the spindle nut can be extended out of the first guide tube 32, or can be retracted when the motor drive direction is correspondingly reversed. Since the first housing part 23 is connected to the first guide tube 32 and the second housing part 24 is connected to the second guide tube 33, the second housing part 24 is thus extended out of the first housing part 23, or retracted when the motor drive direction is correspondingly reversed.

Furthermore, the driving device 21 comprises a spring system 34 which is arranged in the installation space 27 or the housing 22 and, in the exemplary embodiment shown here, comprises the first spring part 1 according to the present disclosure. A first end 1a of the spring part 1 rests against the motor 31 of the spindle drive 30, and a second end 1b of the spring part 1 rests against the second housing end 26. As a result, the spring part 1 pretensions the first housing part 23 and the second housing part 24 against one another in the direction of the extended state of the driving device 21, i.e., in the state in which the distance between the first housing end 25 and the second housing end 26 is maximum.

Each of the spring windings 3 of the spring part 1 runs concentrically around the spring axis F. In this case, the spring axis F in turn runs helically around the longitudinal axis L of the housing 22. The distance, respectively given perpendicularly to the longitudinal axis L, between the spring axis F and the longitudinal axis L is constant in the exemplary embodiment shown here. This advantageously results in all spring windings 3 being arranged eccentrically to the longitudinal axis L, and each spring winding 3 thus having an outer winding portion 3a with a maximum distance to the longitudinal axis L and an inner winding portion 3b with a minimum distance to the longitudinal axis L.

Furthermore, as a consequence of the windings 3 being arranged eccentrically to the longitudinal axis L or the spring axis F running helically around the longitudinal axis L, the outer winding portion 3a with a maximum radial distance to the longitudinal axis L is in contact with an inner side 24a of the second housing part 24. The second housing part 24 thus, advantageously, functions as a guide or radial support for the spring part 1. In the preferred exemplary embodiment considered here, due to the helical profile of the spring axis F around the longitudinal axis L, all spring windings 3 that are arranged within the second housing part 24 are supported at a contact point by the inner side 24a of the second housing part 24.

As a further consequence of the eccentric arrangement of the windings 3 relative to the longitudinal axis L, or of the fact that the spring axis F runs helically around the longitudinal axis L, the inner winding portion 3b with a minimum radial distance to the longitudinal axis L is in contact with an outer side 32a of the first guide tube 32 of the spindle drive 30. Advantageously, the first guide tube 32 of the spindle drive thus functions as a radial support for the spring windings 3 surrounding it. The second guide tube 33 can basically be used as a second guide portion for a second spring part, wherein the second spring part would have spring windings of a smaller diameter.

In the preferred exemplary embodiment considered here, due to the helical profile of the spring axis F around the longitudinal axis L, all windings 3 that run around the first guide tube 32 of the spindle drive 30 are supported by the outer side 32a of the first guide tube 32 at at least one contact point. Since the spring part 1 has lubricant on the outside, noise-inducing stick-slip movements are, advantageously, avoided.

Figure 4:
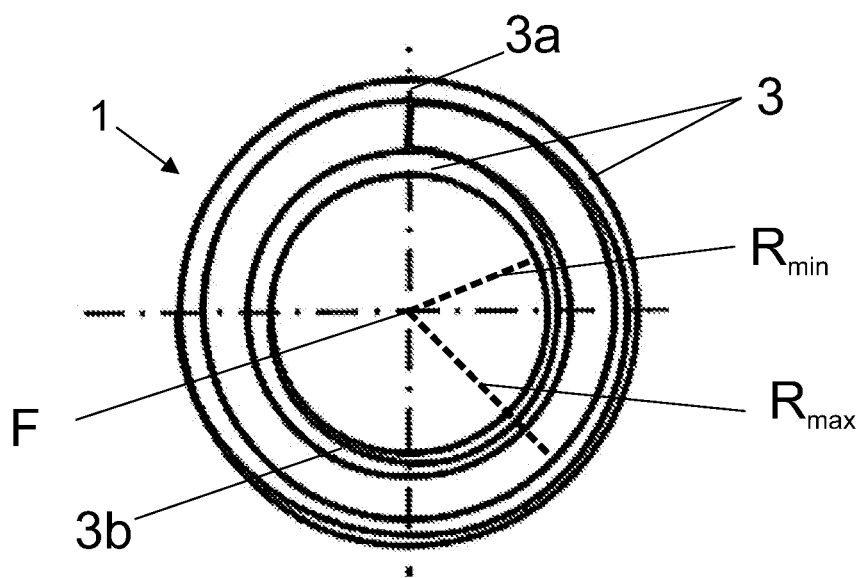
FIG. 4 shows the spring part 1 of FIG. 1 or FIG. 3 in a schematic frontal view.

FIG. 4 shows the spring part 1 of FIG. 1 in a schematic front view. This view shows the spring part 1 from a view in the direction of the spring axis F. As can be seen here, a minimum inner radius $R_{Min}$ (shown by dashed lines) and a maximum outer radius $R_{Max}$ (shown by dashed lines) of the windings 3 are visible through the helically-curved profile of the spring axis F. The portions 3a of the windings 3 that have a maximum outer radius or a maximum radial distance to the central axis M of the spring part 1 are suitable, for example, as shown in FIG. 3, for resting against an inner wall of a housing of a driving device. The inner portions 3b of the windings 3 that have a minimum outer radius $R_{Min}$ or a minimum radial distance to the central axis M of the spring part 1 are suitable, as shown in FIG. 3, for resting against an outer side of a guide arrangement or of other components within a housing of a driving device.

The spring part 1 can thus be inserted into a given installation space of a housing, wherein the guidance of the spring part is ensured in that the inner or outer radius of the spring part is variable as a result of the helical profile of the spring axis F. As a result, bending of the spring part during operation is, advantageously, minimized, and undesired impact noise thus avoided. Due to the coating of the spring part 1 or of the base material 4 of the spring body 2 with the protective layer 5 formed as a lacquer layer, in combination with the lubricant 6, corrosion resistance of the spring part is additionally created, and jerky sliding of the spring windings 3 on the guide surfaces in the driving device 21 is, moreover, advantageously prevented in order to avoid disturbing noise.

Above, a spring part according to the present disclosure was explained using an exemplary embodiment in which the spring axis F is designed to be helical. It is understood that the spring axis can also have other profiles, insofar as contact of the spring windings with guide components of the driving device, and thus advantageous guidance of the spring part, is thereby brought about, which avoids noise-inducing impact of the spring windings. For example, the spring axis may run sinusoidally in one plane.

What is claimed is:

1. A spring part for a driving device comprising:
   a spring body extending around a central axis, the spring body comprising several spring windings which run radially around a spring axis and are made of at least a base material,
   the base material being a chromium-silicon-vanadium-alloyed spring steel wire,
   the base material being surrounded at least by a first protective layer,
   the first protective layer being a zinc flake coating applied to the base material in a spraying method or a spray-coating method,
   the spring body being at least partially covered on the outside by a lubricant,
   the lubricant being a silicone-based lubricant.

2. The spring part according to claim 1, wherein the lubricant is a silicone grease.

3. The spring part according to claim 1, wherein the silicone-based lubricant comprises a solid additive.

4. The spring part according to claim 3, wherein the solid additive is PTFE.

5. The spring part according to claim 1, wherein the base material is a metal or metal alloy.

6. The spring part according to claim 1, wherein the base material is surrounded by a second protective layer.

7. The spring part according to claim 6, wherein the second protective layer is arranged above the first protective layer.

8. The spring part according to claim 6, wherein the second protective layer is a sliding-lacquer layer.

9. The spring part according to claim 8, wherein the sliding-lacquer layer advantageously contains a solid lubricant selected from a group comprising polytetrafluoroethylene (PTFE), molybdenum disulfide ($MoS_2$), boron nitride, graphite, or a combination of various solid lubricants.

10. The spring part according to claim 6, wherein the second protective layer is formed as an organic, solvent-based, high-temperature PTFE coating.

11. A method for manufacturing a spring part, comprising:
    providing a spring body with several spring windings made of a base material, the base material being a chromium-silicon-vanadium-alloyed spring steel wire;
    coating the base material at least with a first protective layer,
    the first protective layer being a zinc flake coating,
    the zinc flake coating being applied to the base material in a spraying method or a spray-coating method; and
    applying a lubricant formed as a silicone-based lubricant to the outside of the coated spring body.

12. The method according to claim 11, wherein a second protective layer is first applied to the first protective layer before the lubricant is applied.

13. A driving device for driving a vehicle door, comprising
    a housing, the housing comprising a first housing part and a second housing part, the first housing part being displaceable relative to the second housing part along a longitudinal axis of the housing; and
    a spring system having at least a first spring part, comprising a first spring portion with several spring windings, the spring windings each running radially around a spring axis,
    the first spring part pretensioning the first housing part and the second housing part against one another in parallel to the longitudinal axis of the housing,
    the first spring part being the spring part according to claim 1.

14. The spring part according to claim 1, wherein the spring axis is configured to be curved and runs helically around the central axis.

15. The spring part according to claim 14, wherein the spring windings are arranged at an offset from the central axis so that the spring windings each have a maximum radial distance and a minimum radial distance to the central axis.

16. The spring part according to claim 1, wherein the spring axis is configured to be curved and runs sinusoidally in one plane.

17. The spring part according to claim 16, wherein the spring windings are arranged at an offset from the central axis so that the spring windings each have a maximum radial distance and a minimum radial distance to the central axis.

18. The spring part according to claim 8, wherein the sliding-lacquer layer has been applied in the spray-coating method.

\* \* \* \* \*